(12) United States Patent
Okada

(10) Patent No.: US 9,492,749 B2
(45) Date of Patent: Nov. 15, 2016

(54) GAME PROGRAM AND GAME SYSTEM

(71) Applicant: CAPCOM CO., LTD., Osaka-shi (JP)

(72) Inventor: Taisaku Okada, Nishinomiya (JP)

(73) Assignee: CAPCOM CO., LTD., Osaka-Shi, Osaka-Fu (JP)

( * ) Notice: Subject to any disclaimer, the term of this patent is extended or adjusted under 35 U.S.C. 154(b) by 167 days.

(21) Appl. No.: 14/383,098

(22) PCT Filed: Feb. 28, 2013

(86) PCT No.: PCT/JP2013/001236
§ 371 (c)(1),
(2) Date: Sep. 4, 2014

(87) PCT Pub. No.: WO2013/132802
PCT Pub. Date: Sep. 12, 2013

(65) Prior Publication Data
US 2015/0224396 A1    Aug. 13, 2015

(30) Foreign Application Priority Data
Mar. 5, 2012 (JP) ................. 2012-048341

(51) Int. Cl.
| | |
|---|---|
| A63F 9/24 | (2006.01) |
| A63F 13/497 | (2014.01) |
| A63F 13/44 | (2014.01) |
| A63F 13/46 | (2014.01) |

(52) U.S. Cl.
CPC ............. *A63F 13/497* (2014.09); *A63F 13/44* (2014.09); *A63F 13/46* (2014.09); *A63F 2300/61* (2013.01); *A63F 2300/634* (2013.01); *A63F 2300/8029* (2013.01)

(58) Field of Classification Search
None
See application file for complete search history.

(56) References Cited

U.S. PATENT DOCUMENTS

| | | | | |
|---|---|---|---|---|
| 5,782,692 A | * | 7/1998 | Stelovsky | A63F 13/005 |
| | | | | 434/307 A |
| 2003/0190951 A1 | * | 10/2003 | Matsumoto | A63F 13/10 |
| | | | | 463/30 |

(Continued)

FOREIGN PATENT DOCUMENTS

| | | |
|---|---|---|
| JP | 11-042368 | 2/1999 |
| JP | 2000-070546 | 3/2000 |

(Continued)

OTHER PUBLICATIONS

International Search Report for International Application No. PCT/JP2013/001236, Apr. 2, 2013.

*Primary Examiner* — Paul A D'Agostino
(74) *Attorney, Agent, or Firm* — IP Business Solutions, LLC

(57) ABSTRACT

Provided is a game program capable of chronologically automatically analyzing the degree of excitement in a game played by a user in order to present where during game-play that the excitement is occurring. The invention causes a computer to function as: operation data acquisition means (300) for acquiring operation data (200); computation means (120) which, on the basis of data including time elapse in a game and the operation data (200), performs computation related to progress of the game at regular time intervals in order to generate game status data (210) describing the state of the game-space and objects within the game-space at each point in time; and heat-up point analysis means (310) which, on the basis of the game status data (210), calculates heat-up points (230) which are degrees of excitement during the game.

5 Claims, 8 Drawing Sheets

(56) References Cited

U.S. PATENT DOCUMENTS

| | | | | |
|---|---|---|---|---|
| 2005/0220349 | A1* | 10/2005 | Furuya | H04N 5/23293 382/195 |
| 2008/0064490 | A1* | 3/2008 | Ellis | H04N 5/44543 463/25 |
| 2008/0268961 | A1* | 10/2008 | Brook | A63F 13/12 463/42 |
| 2010/0166065 | A1* | 7/2010 | Perlman | A63F 13/12 375/240.07 |
| 2010/0298055 | A1* | 11/2010 | Kouhi | H04L 67/38 463/43 |
| 2011/0124385 | A1 | 5/2011 | Otomo et al. | |
| 2012/0159329 | A1* | 6/2012 | Chow | G11B 27/329 715/716 |
| 2014/0029921 | A1* | 1/2014 | Warren | G11B 27/031 386/282 |
| 2014/0194211 | A1* | 7/2014 | Chimes | A63F 13/497 463/43 |

FOREIGN PATENT DOCUMENTS

| | | |
|---|---|---|
| JP | 2000-157734 | 6/2000 |
| JP | 2001-187266 | 7/2001 |
| JP | 2002-278662 | 9/2002 |
| JP | 2010-017362 | 1/2010 |
| JP | 2010-233751 | 10/2010 |
| JP | 2011-072735 | 4/2011 |
| WO | WO 2013/132802 A1 | 9/2013 |

* cited by examiner

FIG.4A

■BREAKDOWNS OF HEAT-UP-POINT

| KINDS OF ATTACKS | ATTACK | GUARD | HIT |
|---|---|---|---|
| NORMAL ATTACK | 10 | 20 | 40 |
| UNIQUE ATTACK INCLUDING APPEAL | 10 | 20 | 40 |
| SWITCHING CHARACTER | 10 | 20 | 40 |
| THROWING | 0 | 60 | 30 |
| SPECIAL ATTACK | 15 | 30 | 60 |
| EX SPECIAL | 20 | 40 | 80 |
| SUPER ARTS | 40 | 20 | 100 |
| LAUNCHING | 20 | 40 | 80 |
| GUARD CANCEL | 20 | 40 | 80 |
| CROSS ARTS | 40 | 20 | 100 |

FIG.4B

■STATUS BONUS

| TYPES | BONUS |
|---|---|
| CROSS ASSAULT | +60 WHEN IT IS MADE |
| PANDORA | +80 WHEN IT IS MADE |
| ASSIST GEM | -10 WHEN IT IS MADE |
| BOOST GEM | +40 WHEN IT IS MADE |
| COMBO INCLUDING SWITCHING THE CHARACTER | +0.1 TIMES OF POINT RATE FOR EVERY SWITCHING CHARACTER |
| HEALTH METERS OF BOTH TEAMS LESS THAN 25% | +3 FOR EACH ACTION |
| DAMAGE BY COUNTER ATTACK | +10 WHEN IT IS MADE |

GAME PROGRAM AND GAME SYSTEM

BACKGROUND OF THE INVENTION

1. Technical Field

The present invention relates to a game program and a game system having a replay function which reproduces a game play performed in response to user operation after the game play has finished.

2. Background Art

A game program and a game apparatus having a replay function that a user can replay a game play which is played by the user or another player have been provided. Some game apparatuses, such as a game apparatus disclosed in JP 2010-264173 A, have a function to mark a noteworthy time point in the long-time game play data as a "highlight".

PRIOR ART REFERENCE

Patent Literature

Patent Literature 1: JP 2010-264173 A

BRIEF SUMMARY OF THE INVENTION

Technical Problem

In the game apparatus disclosed in JP 2010-264173 A, a highlight is set by designating operation at a time point which seems to be the highlight while a user is replaying the whole game play data. That is, the user must designate the highlight by him or herself and replay the whole game to designate the highlights, which is troublesome. Further, when the user replays the game play data wherein the highlight is designated, the user cannot reach the highlight without replaying from the beginning, if the user wants to replay only the highlight.

The present invention is aimed at providing a game program and a game system which can provide an excitement part in the game play by chronologically and automatically analyzing a degree of excitement of the game play performed in response to the user's operation, and more, can replay only the excitement part.

Solution to Problem

A game program in the present invention drives a computer to function as an operation data acquisition means, a computation means and a heat-up-point analysis means. The operation data acquisition means acquires operation data to control game progress. The computation means generates game status data which shows a state of a game space and an object in the game space at each time point on the basis of data containing a lapse of time in the game and the operation data. The heat-up-point analysis means calculates the heat-up-point which is a degree of the game progress on the basis of the game status data.

The game program may further drive a computer to function as a heat-up-point display means, a replay section designation means, a section replay means and a rendering means. The heat-up-point display means displays the heat-up-point chronologically. The replay section designation means designates a replay section by an operation to designate an interval of the section chronologically on a chronological display of the heat-up-point. The section replay means generates the game status data by the same process of the computation means using the operation data in the designated replay section. The rendering means renders the game screen on the basis of the game status data generated by the section replay means.

In the above invention, the game program may further drive a computer to function as a jump-point data saving means. The jump-point data saving means sets a jump-point at one or some time points in the game and stores the game status data at the jump-point in the storage unit during the computation by the computation means. The section replay means searches the previous jump-point of the replay starting point of the designated replay section and generates the game status data at a replay starting point by using the game status data at the previous jump-point and the operation data from the jump-point to the replay starting point.

The second game program in the present invention drives a computer to function as an operation data acquisition means, an operation data storage means, a game progress computation means and a rendering means. The program further drives a computer to function as an operation data read-out means, an analysis computation means and a heat-up-point analysis means during analyzing, and as a heat-up-point display means, a replay section designation means, the computation means and the rendering means during replaying.

The operation data acquisition means acquires the operation data during the game. The operation data storage means stores the operation data chronologically in the storage unit. The game progress computation means computes about the game progress every certain time interval in the game and generates the game status data which describes the game space and the status of the character at the moment on the basis of data comprising a lapse of time in the game and the operation data. The rendering means renders a game screen on the basis of the game status data generated by the game progress computation means.

During analyzing, the operation data read-out means reads out the operation data stored by the operation data storage means. The analysis computation means computes about the game progress every certain time interval in the game and generates a game status data which describes the game space and the status of the character at the moment on the basis of data comprising a lapse of time in the game and the operation data. The heat-up-point analysis means calculates the heat-up-point which is a degree of excitement of the game on the basis of the game status data generated by the analysis computation means During replaying, the heat-up-point display means displays the heat-up-point chronologically. The replay section designation means designates a replay section by an operation to designate an interval of the section chronologically on a chronological display of the heat-up-point. The computation means generates the game status data in which the game space and the character status at any points are described. The rendering means renders a game screen on the basis of the game status data generated by the section replay means.

And the game system in the present invention comprises a storage unit for storing the game program and a control unit executing a program stored in the storage unit.

Furthermore, in the present invention, the heat-up-point analysis means may calculate the heat-up-point in response to an operation of the analysis instruction by the user. The operation data acquired by the operation data acquisition means may be that the data row stored chronologically is read out sequentially and may also be what is input in real time from the operation unit operated by the user. The heat-up-point analysis means may calculate the heat-uppoint on the basis of activity contents of an object in the game operated by the operation data. In this case, a value which is sorted beforehand respectively for the each activity content may be used for the calculation of the heat-up-point.

Advantageous Effects of Invention

According to the present invention, a heat-up-point is calculated chronologically on the basis of operation data. Thus, a user can easily find an excitement part in the game play by referring to the heat-up-point.

Further, according to the present invention, the user can replay promptly even in the middle of the game play by using jump-point-data. Thus, it becomes possible to perform a section replay only of the excitement part effectively.

BRIEF DESCRIPTION OF DRAWINGS

FIG. 4A is a diagram showing a table wherein a heat-up-point assigned to attacks and status is described.

FIG. 4B is a diagram showing a table wherein a heat-up-point assigned to attacks and status is described.

DETAILED DESCRIPTION OF THE EMBODIMENT

Referring to the figures, a game program and a game apparatus (a game system) constituted by the game program and a game device (a hardware) that are embodiments of the present invention will be explained.

Figure 1:
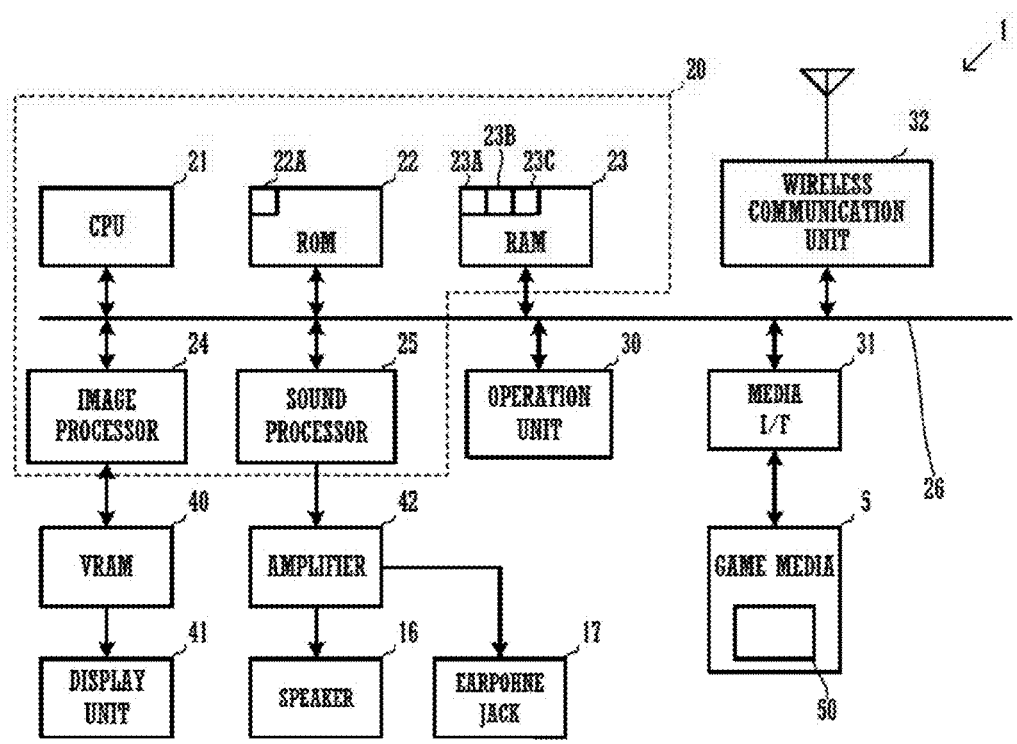
FIG. 1 is a block diagram of a game device wherein a game program of the present invention is loaded.
Figure 2:
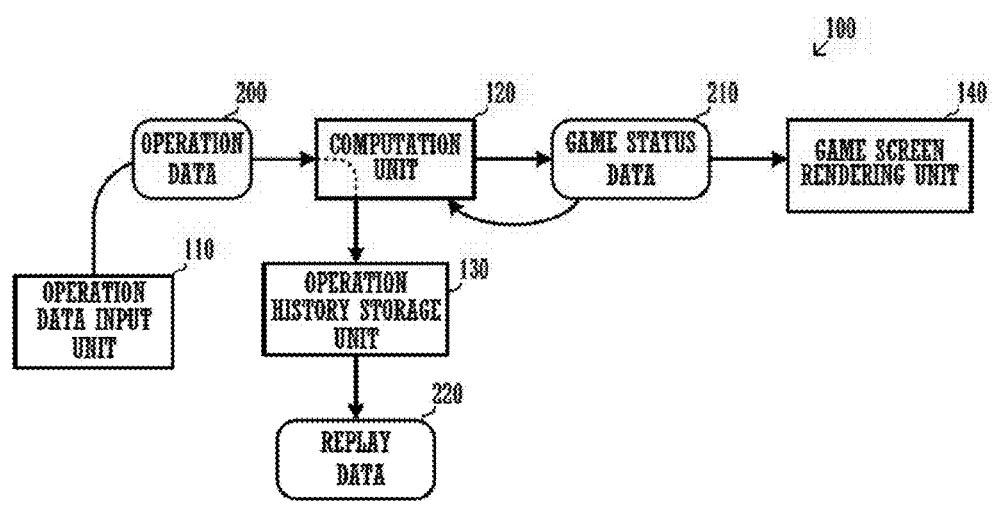
FIG. 2 is a functional block diagram of the game apparatus (in a normal mode) which is constituted by cooperation between the game device and a game program.
Figure 3:
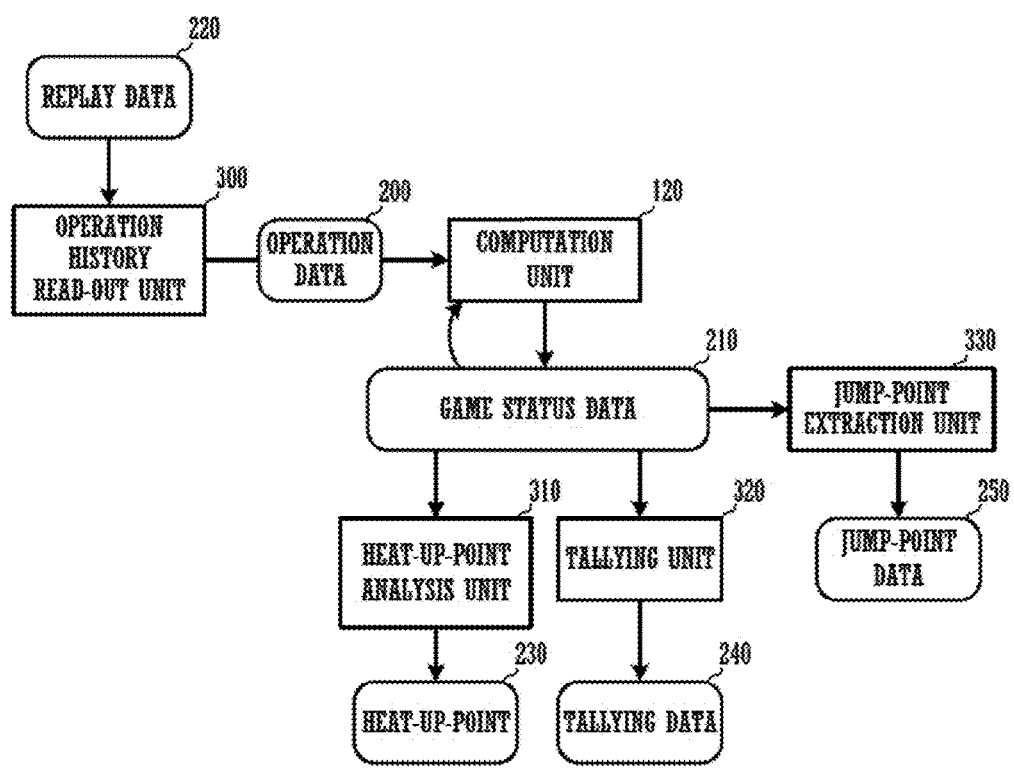
FIG. 3 is a functional block diagram of the game apparatus (in analysis process) which is constituted by cooperation between the game device and a game program.

FIG. 1 is a block diagram of an electronic circuit of a game device 1. Also, FIGS. 2, 3, and 4 are functional block diagrams of a game apparatus 100 constituted by cooperation between the game device 1 and a game program 50. In a game performed by the game apparatus 100, a main character fights with an opponent character by moving and making attacks in response to user's (player's) operation. The game apparatus 100 stores user's operation history in the game play as replay data, and then replays the game play by reading out the replay data as same as the game play being played in real time. The function is called a replay function.

In FIG. 1, the game device 1 has a control unit 20, an operation unit 30, a media interface 31 and a wireless LAN communication unit 32 on the bus 26. The control unit 20 includes a CPU 21, a ROM (flush memory) 22, a RAM 23, an image processor 24 and a sound processor 25. The image processor 24 is connected to a video RAM (VRAM) 40 and the VRAM 40 is connected to a display unit 41. The display unit 41 includes a liquid crystal display and displays a game screen. The sound processor 25 is connected to an amplifier 42 including a D/A converter and the amplifier 42 is connected to a speaker 16 and an earphone jack 17.

The operation unit 30 includes a touch panel, buttons, a direction key and a touch pad formed on the display. The touch panel, buttons, direction key and touch pad accept the user's operation and generate an operation signal in response to the content of user's operation. The generated operation signal is put into the CPU 21.

The media interface 31 includes a media slot and the media slot is connected to a game media 5. The media interface 31 reads out the game program 50 by accessing the game media 5 set in the media slot. Besides, the game program 50 includes game data necessary for the game progress. A dedicated semiconductor memory is used as the game media 5. The game media 5, however, is not limited to the dedicated semiconductor and a general-purpose semiconductor memory, an optical disk and the like may be used as the game media 5.

In the RAM 23, a loading area and a working area are set. The game program 50 loaded from the game media 5 is saved in the loading area. The working area is used when the CPU 20 executes the game program 50. The working area includes a heat-up-point storage area 23A, a totalizing data storage area 23B and a jump-point data storage area 23C, which will be explained later. A ROM 22 is a flash memory, which has a replay data storage area as well as a basic program. The basic program is the program which the game device 1 uses for reading the game program 50 from the game media 5 and performing the game. In the replay data storage area, replay data 220 explained later is saved in a non-volatile manner.

An image processor 24 has a Graphics Processing Unit (GPU), which generates game space according to instruction from the CPU 21, draws an image obtained by photographing the game space by a virtual camera and spreads the rendered image as the game image on the VRAM 40.

The sound processor 25 has a Digital Signal Processor (DSP) and generates game sound such as sound which an object emits in response to activities of the object. The amplifier 42 amplifies and outputs the sound signal to the sound speaker 16 and the earphone jack 17.

The wireless communication unit 32 has a digital communication circuit for 2.4 GHz band and performs internet communication via wireless access point and direct communication with another game device 1 using the digital communication circuit. The direct communication with another game device 1 is called local communication. The internet communication is performed over IEEE802.11g standard (what is called "Wi-Fi"), on the other hand, the local communication is performed over an ad hoc mode of IEEE802.11b or its own standard by the wireless communication unit 32. The game apparatus 100 shown in FIG. 2 receives the replay data 220 from another game apparatus with the communication functions and saves the data in the replay data storage area 22A explained above.

Referring to the functional block diagrams shown in FIGS. 2, 3, and 4, the game apparatus (game system) 100 performed by the game program 50 in the game media 5 being loaded in the game device 1 (a hardware) will be explained.

As shown in FIG. 2, the game apparatus 100 functions as an operation data input unit 110, a computation unit 120, an operation history storage unit 130, and a game screen rendering unit 140 in a normal mode. The operation data input unit 110 is performed by cooperation among the game control unit 20, the game operation unit 30 and the game program 50. The game screen rendering unit 140 is performed by cooperation among the game control unit 20, the VRAM 40, the display unit 41 and the game program 50.

The operation data input unit 110 takes in an operation signal generated by user's operation of the operation unit 30 and inputs it as an operation data 200 into the computation unit 120. The computation unit 120 executes computation of the contents related to the game progress and a rendering of the game image on the basis of the operation data 200 and the game data and outputs the data which is the result of the computation as game status data 210.

The computation executed by the computation unit 120 is, for example, a computation of actions of a main character, a computation of actions of an opponent character in response to the main character's action or a lapse of time and a computation of the environment changing with the lapse of time. Further, when the input operation data 200 is an operation for making attacks, the computation unit 120 executes computation for making the main character make the attacks, whether the made attack is hit to the opponent character and damage amount of the opponent character in a case in which the attack is hit.

The computation unit 120 executes computation of the current game status data 210 using the operation data 200 and the lapse of time as a variable and the previous game status data 210 as a basis, and outputs the current game status data 210 every 1/60 second. The game status data 210 is input the game screen rendering unit 140, which renders the game screen on the basis of the game status data 210 and displays on the display unit 41. By the processes above of the game apparatus 100, the game is progressed in response to the operation of the operation unit 30 by the user and the lapse of time, and then the game screen which is changed with the game progress is displayed on the display unit 41.

The operation data 200 is input to the computation unit 120 and also to an operation history tracing unit 130 from the operation data input unit 110. The operation history tracing unit 130 attaches its operation time information to the operation data 200 which is input sequentially and saves the data row as the replay data 220 in the replay data storage area 22 A.

Then the replay mode of the game apparatus 100 will be explained. In the replay mode, analysis process and replay process are executed. In the replay process, the game apparatus 100 reads out the replay data 220 stored in the replay data storage area 22A and analyzes a degree of excitement at each time point during playing the game. And the game apparatus 100 tallies kinds of the attacks which are actuated, etc. and set the jump-point to replay the game promptly from any time points. Further, in the replay process, the game apparatus 100 promptly replays the section designated by the user using the jump-point set in the analysis process.

When the analysis process is executed, the game apparatus 100 functions as an operation history read-out unit 300, the computation unit 120, a heat-up-point analysis unit 310, a tallying unit 320, and a jump-point extraction unit 330 as shown in FIG. 3.

The operation history read-out unit 300 reads out chronologically the operation data from the replay data 220 sequentially and inputs the read-out operation data in the computation unit 120. The replay data 220 may be stored by the operation history storage unit 130 in FIG. 2 or may be obtained from another game apparatus 100.

The computation unit 120 progress the game by the computation on the basis of the operation data 200 and the game data in the same way of the computation as executing the game in the normal mode. However, the speed of reading out the operation data 200 by the operation history read-out unit 300 is much faster than that of inputting the operation data 200 in a case in which the user really plays the game. The computation unit 120 progress the game promptly on the basis of the operation data 200 input promptly.

The heat-up-point is a parameter which shows a degree of excitement of the game calculated every certain time interval on the basis of the game status data 210 generated by the computation by the computation unit 120. The heat-up-point analysis unit 310 calculates the heat-up-point 230 every certain time interval and saves it in the heat-up-point storage area 23A provided in the RAM 23.

The heat-up-point is, for example, provided in response to attacks performed by the user character controlled by the operation data 200, which is, for example, calculated using an operation expression below.

The heat-up-point=attack points+guard points+hit points+status bonus.

The attack points are provided by the user character making attacks. The guard points are added by an opponent character defending the attacks performed by the user character. The defenses by the opponent character are such as receiving the user character's attack with the opponent character's arms, protectors or the like and the opponent character escaping from the user character's attack. The hit points are provided when the user character's attack hits the opponent character. To hit means, for example, the user character's attack definitely hits the opponent character, the opponent character is blown off by the user character's attack or the like. Thus, the guard point and the hit point are provided alternatively in response to whether the user character's attack hits the opponent character or is defended by the opponent character. The volume of the points depends on kinds of the attacks. The points of each kind of attacks is determined in the game data as a table shown in FIG. 4A.

Further, the status bonus is a point which is provided in response to the character status when the attack is made. It is determined in the game data how many points of the status bonus are added and what the status is as a table shown in FIG. 4B.

The operation expression of the heat-up-point is not limited above. Plus"+" is only used in the above expression, however, other operators may be used to calculate the heat-up-point from the parameters.

On the basis of the computation result by the computation unit 120, the tallying unit 320 tallies kinds of the attacks performed by the use character in response to the operation data 200, whether the attack is hit to the opponent character or not, the amount of the damage which the user character gave to the opponent character and the like. The tallying unit 320 saves the tallying data 240 in the tallying data storage area 23B provided in the RAM 23.

The jump-point extraction unit 330 sets one or more time points in the game as a jump-point and saves the game status data 210 at that moment as the jump-point data 250 in the jump-point data storage area 23C. The jump-points, for example, are set at the points in every 10 seconds from the beginning of the game. The jump-point data 250 which is the game status data 210 is the data in which all the game progress status at that moment has been described. Thus, the game apparatus 100 can render a game image replaying status of the game space and the whole characters at that moment on the basis of the data. Also, the game apparatus 100 can continue to progress the game on the basis of the operation data 200 if the game is being replayed and the operation data 200 is input. Therefore, by memorizing the game status data 210 at the jump-point in the middle of the game as the jump-point data 250, it becomes possible that the user cannot only start replaying from the beginning by reading out the operation data 200 but from the jump-point in the middle of the game.

Figure 5:
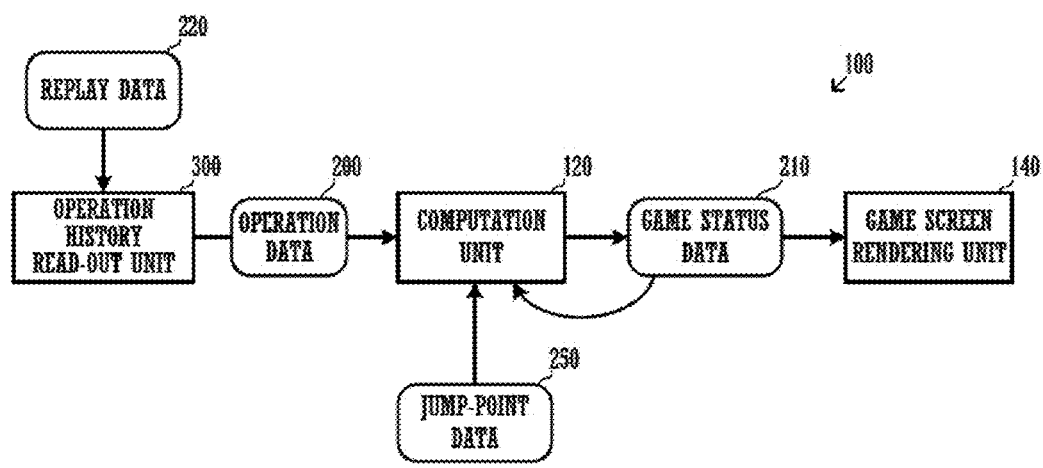
FIG. 5 is a functional block diagram of the game apparatus (in replay process) which is constituted by cooperation between the game device and a game program.

In the replay process, the game apparatus 100 accepts the designation of the replay section by the user and executes the replay of the designated section promptly with the jump-point. The game apparatus 100 functions as the operation history read-out unit 300, the computation unit 120, and the game screen rendering unit 140 as shown in FIG. 5.

Figure 6:
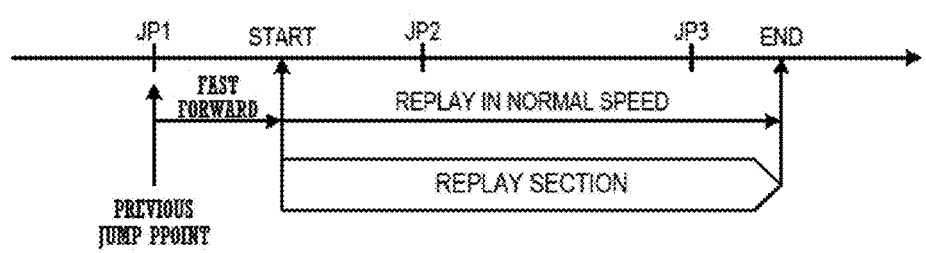
FIG. 6 is a diagram illustrating the process of the replay process of the game apparatus.

Referring to FIG. 6, the processing by the computation unit 120 during replaying will be explained. The computation unit 120 searches the jump-point just before the starting point of the replay section and reads out the jump-point data 250 of the jump-point, which is the game status data 210 at that point, once the replay section is designated. The computation unit 120 reads out the operation data after the jump-point promptly and executes the computation to the replay starting point on the basis of the jump-point data 250. The game apparatus 100 executes the computation reading out the operation data 200 in normal speed after the replay starting point and renders and displays the game image inputting the generated game status data 210 in the game screen rendering unit 140. The processing will be kept until the end point of the replay comes.

According to the processing above, the replay can be started more promptly than reading out the operation data 200 from the beginning when the replay section in the middle of the game is designated.

The replay mode in the game apparatus 100 will be explained below. The game device 1 functions as the game apparatus 100 loading the game program 50 when the device is turned on and displays the game screen on the display unit 41. The game apparatus 100 moves to the normal mode if the game play is selected on the menu screen and also moves to the replay mode if my collection which is the replay data 220 is selected to read out.

The game apparatus 100 prompts the user to select identification information (a player name, recording date, etc.) of the replay data 220 stored in the replay data storage area 22A after shifting to the replay mode. As described above, not only the replay data 220 of the game play which the user of the game apparatus played, but also replay data 220 of another game apparatus (another game player) obtained by the internet communication, the direct communication or the like is saved in the replay data storage area 22A.

Figure 7:
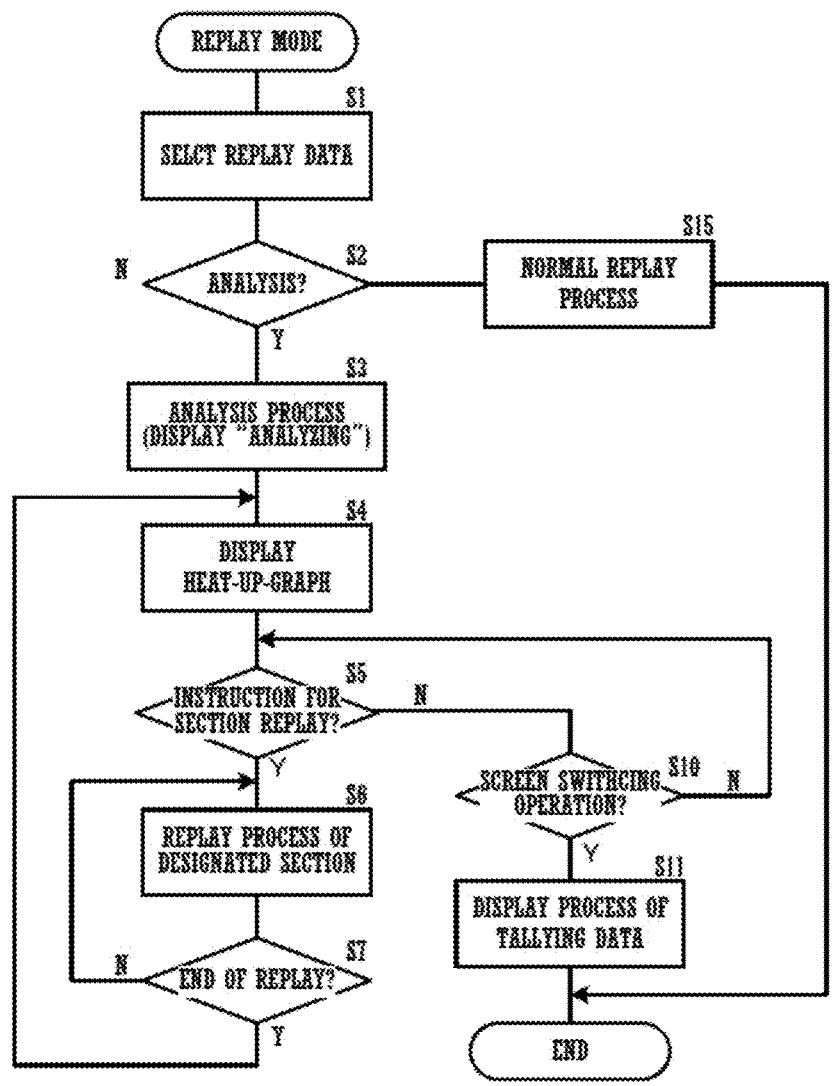
FIG. 7 is a flowchart showing an action in the replay mode of the game apparatus.

In the flowchart of FIG. 7, if any of the replay data 220 is selected by the user with displaying the identification information of the replay data 220 (S1), the game apparatus 100 receives an input whether the selected replay data is analyzed or not (S2). If not (No in S2), the game apparatus 100 performs normal replay process. The normal replay process means the process which replays the game sequentially from the beginning by inputting the operation data 200 of the replay data 220 read out as fast as the actual lapse of time from the beginning in the computation unit 120.

On the other hand, if it is input to analyze the selected replay data (YES in S2), the game apparatus 100 performs the analysis process by constituting the functional unit shown in FIG. 3. After the analysis process, the game apparatus 100 displays the heat-up graph screen 400 in which the calculated heat-up-point 230 is displayed as a time-series graph (S4).

Figure 8:
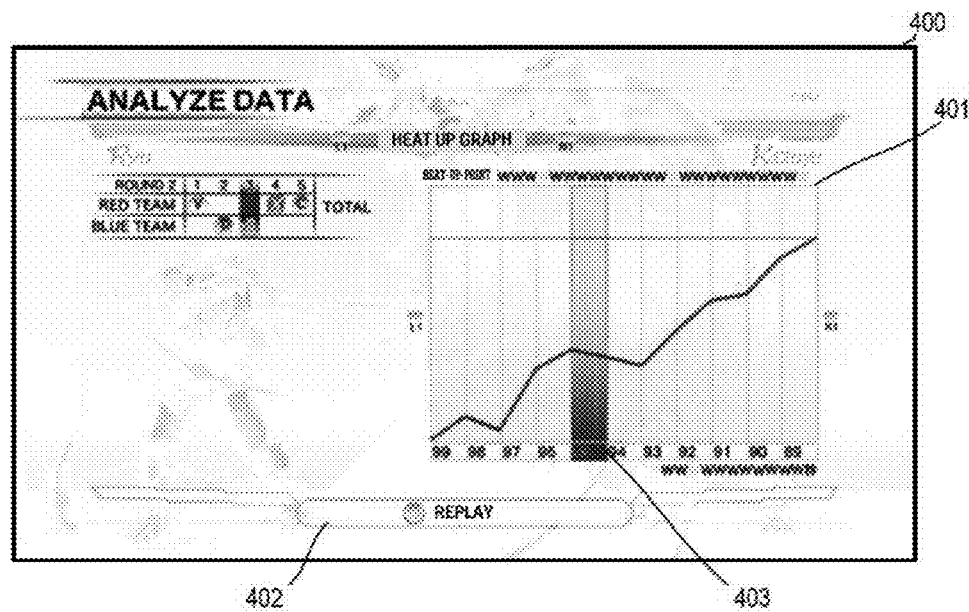
FIG. 8 is an image diagram showing an example of a screen displaying a heat-up-graph.

FIG. 8 is a figure shown the display example of the heat-up graph screen 400. The heat-up graph screen 400 is displayed in the display unit 41. The heat-up graph 401 representing the heat-up-point on the vertical axis and the lapse of time on the horizontal axis is displayed on the screen 400. Also, a replay button 402 is displayed on the bottom of the screen 400. The replay section 403 is designated by tracing a section on the graph 401 which the user want to replay from the right to the left (or from the left to the right) with a touch pen, etc. Then, once the replay button 402 is clicked, the game apparatus 100 starts replaying the designated section. Thus, it becomes easy to select the section which seems to be exciting in the game because the user can designate the replay section 403 on the heat-up graph 401.

In a flowchart of FIG. 7, after displaying the heat-up graph screen 400 in FIG. 8, the game apparatus 100 will wait until the replay button 402 is clicked after designating the replay section (S5) or the screen switching operation to the tallying data display screen is performed (S10) by the user.

By the process above, if the user designates the replay section and click the replay button 402 (YES in S5), the game apparatus 100 executes the replay process of the designation section in the process explained in FIG. 6. The game apparatus 100 returns to the display of the heat-up graph in S4 after performing the replay process until the endpoint of the replay section (Yes in S7).

Figure 9:
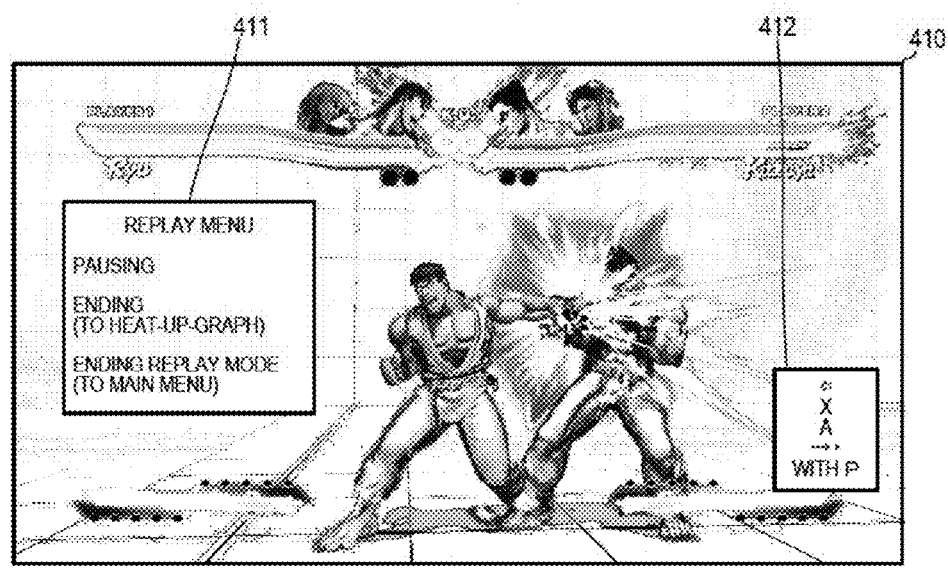
FIG. 9 is an image diagram showing an example of a game screen which is displayed during replaying.

During replaying, the game progresses in the same contents as the game the user actually played and the game screen 410 such as the screen shown in FIG. 9 is displayed on the display unit 41 of the game device 100, though the game device 100 displays a menu box 411 and an operation data box 412 as shown in the game screen 410 in FIG. 9 in response to the specified operation by the user during replaying. In the menu box 411, the menu such as pause, end and end of the replay mode is displayed. The user can select pausing the replay mode, ending, and ending the replay mode by selecting the menu. If the end in the menu box 411 is selected, the process returns to S4. The operation data box 412 is also a window which chronologically displays the operation data 200 read out in the replay. An image corresponded to the operation by the operation data 200 is displayed in the operation data box 412. The displayed image is scrolled from bottom to top in response to reading out another operation data 200.

On the other hand, once it is detected that the screen switching operation is performed (YES in S10), the game apparatus 100 executes the tallying data display process (S11).

Figure 10:
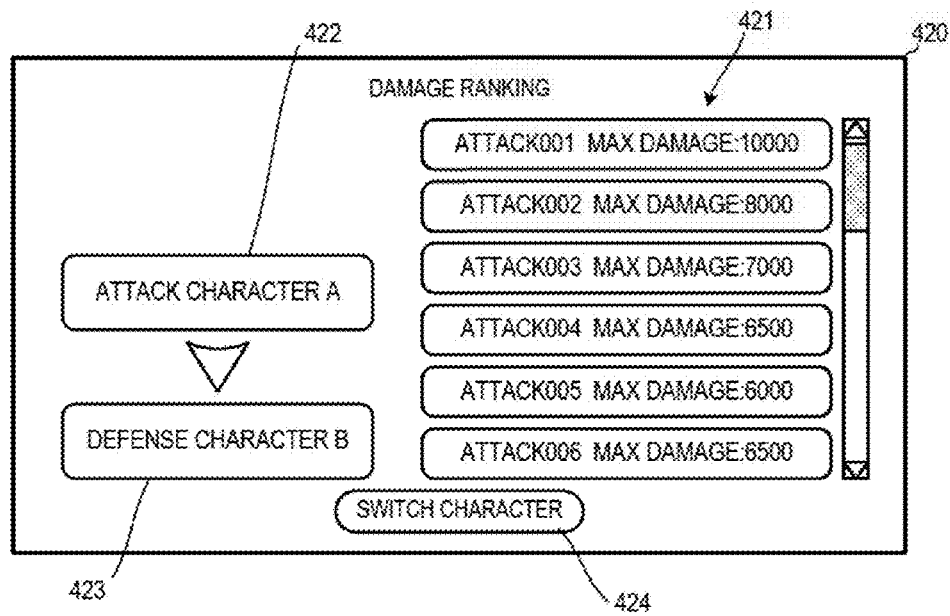
FIG. 10 is an image diagram showing an example of a screen displaying a damage ranking.
Figure 11:
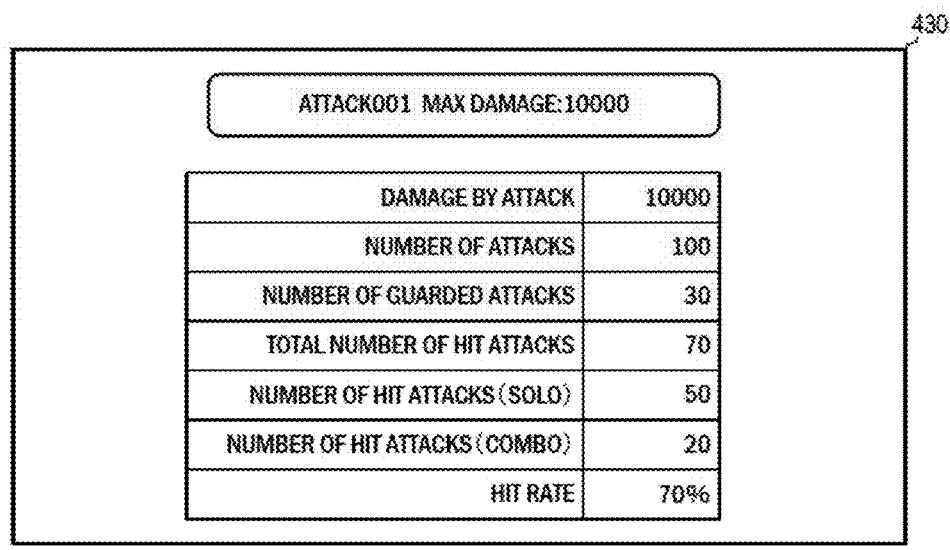
FIG. 11 is an image diagram showing an example of a screen displaying a tally of each kind of attack.

Referring to FIGS. 10 and 11, the tallying data display process will be explained. The damage ranking screen 420 shown in FIG. 10 is displayed in the tallying data display process at first. The damage ranking screen 420 includes a damage ranking list 421. The damage ranking list 421 displays a list of attacks made by the attack character displayed on the display field 422 to the defense character displayed on the display field 423 in descending order of the damage amount to the defense character. Besides, a parameter which becomes the object for tallying in the process of tallying data display is not limited to the damage by the attack, which may be anything that is capable of being comprehended visually or aurally.

On the display of the damage ranking list 421, the user character controlled by the operation data 200 is selected by default as the attack character. The user can change the attack character by clicking the character switching button 424. The user can also change the defense character displayed on the display field 423 by clicking the character switching button 424.

While the damage ranking list 420 is being displayed, if any one of attacks in the damage ranking list 421 is selected, that is, any display field of the attacks is clicked, the game apparatus 100 displays the tallying screen 430 about the selected attack shown in FIG. 11. On the tallying screen 430, total amount of damage which the opponent character is gotten by the attack, hit rate, number of attacks, number of guarded attacks, total number of hit attacks, number of hit attacks made by itself (solo), and number of hit attacks made as one of the continuous attacks (combo) are displayed.

On the tallying data display process, a menu box 411 shown in FIG. 9 is displayed on the screen 420 and 430 in response to the user's specific operation. In response to the selection of the menu in the menu box 411 by the user, the game apparatus 100 shifts the display contents to the heat-up graph display shown in FIG. 7 and executes the process such as returning to S4 with finishing the replay mode.

Figure 12:
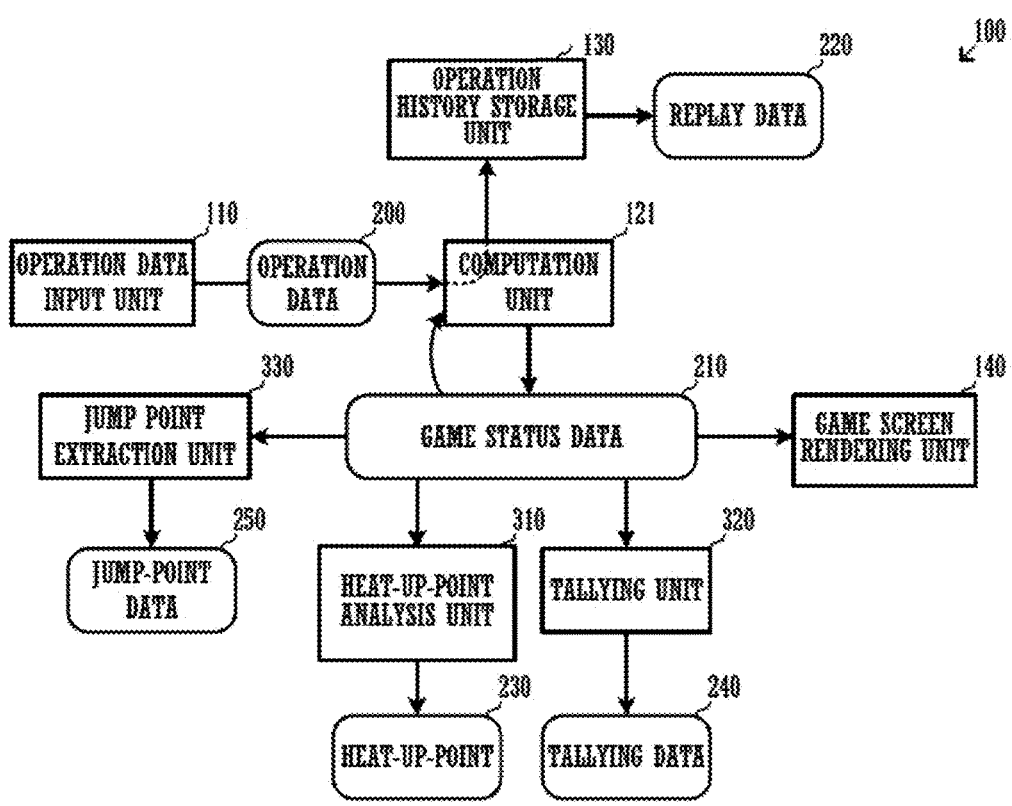
FIG. 12 is a functional block diagram of another embodiment of the game apparatus.

In the embodiment above, the game apparatus 100 saves the operation data 200, etc. as it is as the replay data 220 in the replay data storage area 22A, and in the replay mode, reads out and analyzes the replay data 220. On the other hand, the game apparatus 100 analyzes in real time and save the analysis data with replay data 220 on the basis of the game status data 210 computed in real time on the basis of the operation data 200. The function structure of the game apparatus 100 which executes the analysis process in a normal mode is shown in FIG. 12. The result of the analysis may be saved in the ROM (flash memory) 22 with the replay data 220. By constituting like this, the heat-up graph 401 can be displayed promptly without the analysis process in the replay mode.

In this embodiment, a game that a plurality of the characters fight making attacks is explained as an example, however, the object of the present invention is not limited to the character, which may be, for example, a vehicle such as a car or a space ship.

Further, the object to which the heat-up-point is provided is not limited to the attacks. The point is provided to an event in which the user is excited in the game, which is, for example, a goal in a sport game, an overtaking in a racing game and the like. FIG. 9 shows images which shows the operation data 200 in the operation data box 412 as listed, however, the operation data 200 at every moments may be displayed in the operation data box 412.

In this embodiment, the game device 1 which is used for games only is explained as an example, however, the present invention is able to be applied to a device which is not used for games only, for example, a mobile phone such as a smart phone, a tablet device and a personal computer.

REFERENCE SIGNS LIST

1 game device
5 game media
20 control unit
21 CPU
22 ROM (flash memory)
50 game program
100 game apparatus

What is claimed is:

1. A non-transitory computer readable medium having a game program for a game in which a user operates an object in a game space by an operating unit, the game program comprising:
    code for acquiring operation data, by a central processing unit, based on the user operating in the game;
    code for generating game status data, by the central processing unit, which shows a state of the game object on the basis of time having lapsed in the game and the operation data;
    code for calculating a heat-up-point, by the central processing unit, which is a degree of excitement in the game on the basis of the game status data;
    code for displaying in time series the heat-up-point of the time having lapsed on a display unit;
    code for designating, by the central processing unit, in the time series a chronological range in which the heat-up point is calculated;
    code for generating, by the central processing unit, the game status data by using the chronological range; and
    code for displaying the game on the display unit on the basis of the game status data.

2. The non-transitory computer readable medium according to claim 1, wherein
    the code for calculating the heat-up-point includes code for calculating the heat-up-point on the basis of a value which is sorted beforehand for activity contents of the object operated by the operation data.

3. The non-transitory computer readable medium according to claim 1, further comprising
    code for setting a jump-point at one or some time points in the game, and
    code for storing the game status data at the jump-point in the storage unit during the computation, wherein
    the code for generating the game status data by using the chronological range includes code for generating the game status data at a replay starting point of the chronological range by searching the previous jump-point being prior to the jump-point of the replay starting point and code for using the game status data at the previous jump-point and the operation data from the jump-point to the replay starting point.

4. A non-statutory computer readable medium having a game program for a game in which a user operates an object in a game space by an operation unit, the game program comprising:
    code for acquiring operation data by the central processing unit;
    code for storing the operation data chronologically in a storage unit;
    code for computing the game progress every certain time interval in the game and for generating game status data which describe the game space and the status of the character at the moment on the basis of data including a lapse of time in the game and the operation data; and
    code for displaying the game on the basis of the game status data generated on a display unit;
    code for reading out the operation data stored by the operation data storage means;
    code for calculating the heat-up-point which is a degree of excitement of the game on the basis of the game status data;

code for displaying in time series the heat-up-point on the display unit, code for designating in the time series a chronological range in which the heat-up-point is calculated;

code for generating the game status data in which the game space and the character status at any points are described; and code for displaying the game on the basis of the game status data.

5. The game system according to claim 4, further comprising code for executing a program stored in the storage unit.

\* \* \* \* \*